(12) United States Patent
Mihara et al.

(10) Patent No.: US 10,087,076 B2
(45) Date of Patent: Oct. 2, 2018

(54) POROUS CARBON MATERIAL

(71) Applicant: TORAY INDUSTRIES, INC., Tokyo (JP)

(72) Inventors: Takaaki Mihara, Otsu (JP); Kentaro Tanaka, Otsu (JP); Kosaku Takeuchi, Otsu (JP); Tomoyuki Horiguchi, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 41 days.

(21) Appl. No.: 15/318,564

(22) PCT Filed: Jun. 16, 2015

(86) PCT No.: PCT/JP2015/067323
§ 371 (c)(1),
(2) Date: Dec. 13, 2016

(87) PCT Pub. No.: WO2015/198920
PCT Pub. Date: Dec. 30, 2015

(65) Prior Publication Data
US 2017/0129780 A1    May 11, 2017

(30) Foreign Application Priority Data
Jun. 23, 2014  (JP) ................. 2014-127884

(51) Int. Cl.
*D01F 9/12* (2006.01)
*C01B 31/02* (2006.01)

(52) U.S. Cl.
CPC .......... *C01B 31/02* (2013.01); *C01P 2002/70* (2013.01); *C01P 2006/40* (2013.01)

(58) Field of Classification Search
CPC ... C01B 31/02; C01P 2002/70; C01P 2006/40
See application file for complete search history.

(56) References Cited

U.S. PATENT DOCUMENTS

2007/0253887 A1  11/2007  Foley
2015/0287547 A1  10/2015  Okuno et al.

FOREIGN PATENT DOCUMENTS

| EP | 2977350 A1 | 1/2016 |
|----|-----------|--------|
| JP | 2160923 | 6/1990 |
| JP | 2160924 | 6/1990 |
| JP | 398624 | 4/1991 |
| JP | 09231984 A | 9/1997 |
| JP | 2002080213 | 3/2002 |

(Continued)

OTHER PUBLICATIONS

International Search Report and Written Opinion for International Application No. PCT/JP2015/067323, dated Jul. 21, 2015, 4 pages.

(Continued)

*Primary Examiner* — Daniel McCracken
(74) *Attorney, Agent, or Firm* — RatnerPrestia

(57) ABSTRACT

Provided is a porous carbon material which has excellent electrical conductivity, thermal conductivity, pressure resistance, and strength against tension and compression. This porous carbon material at least partially includes a continuous porous structure, and exhibits excellent electrical conductivity, thermal conductivity, pressure resistance, and strength against tension and compression by containing carbon crystal grains therein.

9 Claims, 3 Drawing Sheets

(56) References Cited

FOREIGN PATENT DOCUMENTS

| JP | 2004259593 | 9/2004 |
| JP | 2006240902 | 9/2006 |
| WO | 2014050579 A1 | 4/2014 |

OTHER PUBLICATIONS

Extended European Search Report for European Application No. 15812756.3, dated Nov. 23, 2017, 7 pages.

POROUS CARBON MATERIAL

CROSS REFERENCE TO RELATED APPLICATIONS

This is the U.S. National Phase application of PCT International Application No. PCT/JP2015/067323, filed Jun. 16, 2015, and claims priority to Japanese Patent Application No. 2014-127884, filed Jun. 23, 2014, the disclosures of each of these applications being incorporated herein by reference in their entireties for all purposes.

FIELD OF THE INVENTION

The present invention relates to a porous carbon material which can be spread for various applications.

BACKGROUND OF THE INVENTION

As porous carbon materials, activated carbons having both macropores which are relatively large pores and micropores, such as particulate activated carbons and activated-carbon fibers; and fine carbons represented by carbon nanotubes and meso-porous carbons produced from meso-porous silica or zeolite template, are known.

Patent Document 1 describes a technique for obtaining porous carbon fibers by mixing a carbonizable material with an eliminable material to be fiberized, and then making the eliminable material disappear during carbonization. However, the carbonizable material and the eliminable material are a combination which forms a non-compatible system, and the mere addition of a compatibilizing agent cannot form continuous pores in the carbon fibers.

Patent Documents 2 and 3 show examples in which a carbon material which itself has a continuous porous structure introduced thereinto is produced by mixing a thermosetting resin with a thermoplastic resin, curing the thermosetting resin, subsequently removing the thermoplastic resin, followed by carbonization. However, these carbon materials merely have a continuous porous structure introduced thereinto and have not had sufficient electrical conductivity, thermal conductivity, or strength.

PATENT DOCUMENTS

Patent Document 1: Japanese Patent Laid-open Publication No. 2-160923
Patent Document 2: Japanese Patent Laid-open Publication No. 2004-259593
Patent Document 3: Japanese Patent Laid-open Publication No. 2006-240902

SUMMARY OF THE INVENTION

It is an object of the present invention to provide a porous carbon material which is excellent in electrical conductivity, thermal conductivity, pressure resistance, and strength against tension or compression.

The object of the present invention is achieved by a porous carbon material which has a continuous porous structure in at least a portion of the porous carbon material and comprises a carbon crystal grain.

The porous carbon material of an embodiment of the present invention has a continuous porous structure in at least a portion thereof, the continuous porous structure being composed of pores (voids) and branches (carbon part). Due to the continuous pores, it is possible to exhibit various functions by filling and/or passing a fluid into or through the pores. Furthermore, since branches are continued, the porous carbon material has higher electrical conductivity and thermal conductivity as compared with the carbon materials in separate particulate form. In addition, an effect in which the branches support one another to maintain the structure body is produced, and due to this effect, the material has some degree of resistance to deformations such as ones caused by tension or compression, as compared with carbon materials having the same porosity.

Due to further containing of the carbon crystal grains, the porous carbon material of an embodiment of the present invention allows electrical conductivity, thermal conductivity, and mechanical property such as tension or compression to be improved, and can provide a porous carbon material applicable to various applications, such as electric and electronic materials, or materials which mediates heat exchange, including a heat dissipation material.

DETAILED DESCRIPTION OF EMBODIMENTS OF THE INVENTION

<Porous Carbon Material>
[Continuous Porous Structure]

The porous carbon material (hereinafter sometimes simply referred to as "material") of an embodiment of the present invention has a continuous porous structure in at least a portion thereof.

Figure 1:
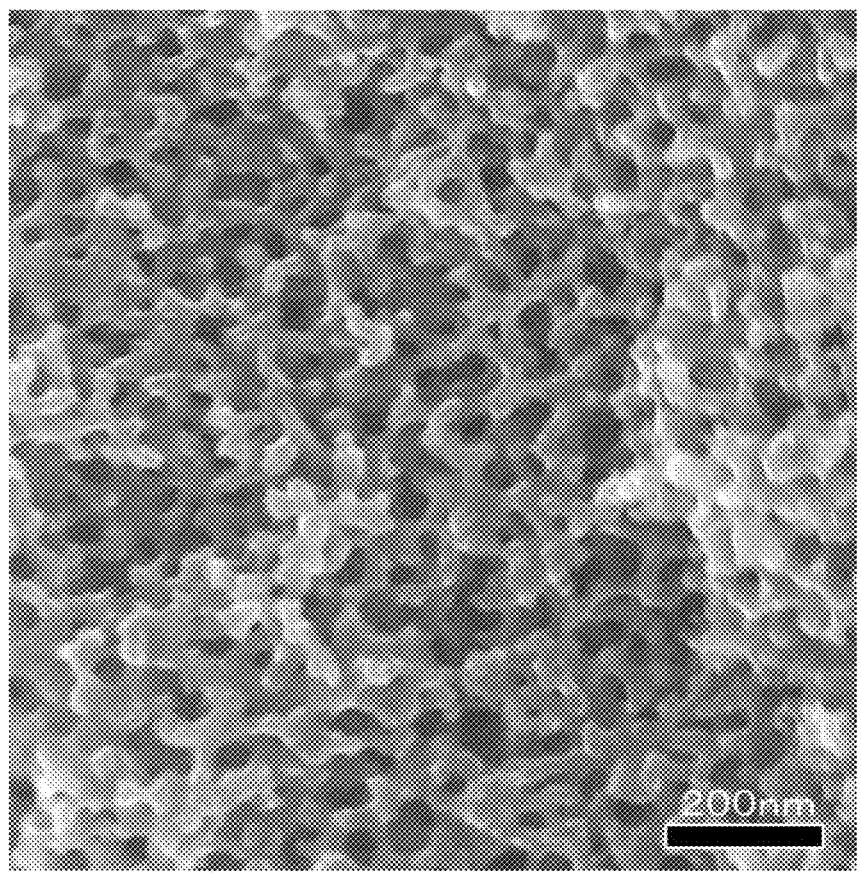
FIG. 1 illustrates a scanning electron photomicrograph of a porous carbon material of Example 1.

The term "continuous porous structure" in the porous carbon material of the present invention means a structure in which branches (carbon part) and pores (voids) are respectively continued. The presence of the continuous porous structure can be confirmed such that when a specimen of the porous carbon material which has been sufficiently cooled, for example in liquid nitrogen, is cut with tweezers or the like and the cut surface is examined with a scanning electron microscope (SEM) or the like, a structure in which branches (carbon part) and pores (voids) are respectively continued inward is observed, as illustrated in the scanning electron photomicrograph of FIG. 1.

The porous carbon material of the present invention can be made to exhibit various functions by filling and/or passing a fluid into or through the pores which constitute the continuous porous structure. For example, it is possible to exhibit the fractionating properties such as separation, adsorption, and elimination of substances, or to exhibit functions required for battery materials by filling an electrolytic solution.

Furthermore, since the continued branches bring about increased electrical conductivity as compared with the carbon materials in separate particulate form, the porous carbon material can be provided as a battery material having low resistance and low loss. Similarly, since the continued branches bring about increased thermal conductivity as compared with the carbon materials in separate particulate form, the high thermal conductivity enables the heat generated inside the continuous porous structure to be rapidly transferred to the outside and makes it possible to maintain high evenness in temperature. In addition, due to the effect in which the branches support one another to maintain the structure body, this material has some degree of resistance to deformations such as ones caused by tension, compression, etc., as compared with carbon materials having the same porosity.

It is preferable that the portion having the continuous porous structure in the porous carbon material according to the present invention has a structural period of 0.002 μm to 1 μm. The structural period of the portion having the continuous porous structure in the porous carbon material of the present invention is determined by irradiating a specimen of the porous carbon material of the present invention with X-rays and calculating the structural period from the scattering angle θ corresponding to the position where the scattered-light intensity has a peak value, using the following equation.

$$L = \frac{\lambda}{2\sin\theta}$$ [Mathematical Formula 1]

Structural period: L, λ: wavelength of incident X-rays

So long as the material has a structural period of 0.002 μm or longer, this material can be easily composited with other materials and also can exhibit excellent separation properties when used, for example, as a separation column material. This embodiment is hence preferred. Meanwhile, so long as the material has a structural period of 1 μm or shorter, this material as a structure body has very few defects and can be a mechanically excellent material. A value of structural period can be selected within the above-mentioned range arbitrarily in accordance with applications.

When the material has the continuous porous structure oriented, the value of the structural period may vary depending on the incident direction of X-rays. It is preferable that when the porous carbon material of the present invention is irradiated with X-rays from any direction and then measured, the structural period is within the above-mentioned range. The continuous porous structure is formed with evenness when observed from any direction. Therefore, a fluid can be uniformly filled and/or passed into or through the continuous porous structure, and it is possible to ensure uniform electrical conductivity and thermal conductivity through the branches. Since this material having an even continuous porous structure allows a fluid to uniformly and rapidly flow into the continuous electrical conductivity and also achieves both uniform electrical conductivity and uniform thermal conductivity, the material is suitable especially as a material accompanying chemical reaction, and may be used specifically as a battery material, a catalyst support or the like.

The continuous porous structure preferably has an average porosity of 10 to 80%. The term "average porosity" means a porosity determined by obtaining a precisely formed cross-section of an embedded specimen by the cross-section polisher method (CP method), examining the cross-section at a magnification regulated so as to result in 1±0.1 (nm/pixel) and at a resolution of 700,000 pixels or higher, setting in the resultant image a square examination region for calculation in which each side has 512 pixels, and calculating the average porosity using the following equation, in which A is the area of the whole examination region and B is the area of the pores.

Average porosity (%)=$B/A\times 100$

The higher the average porosity thereof, the more the efficiency of filling can be heightened when the material is composited with other materials and the lower the pressure loss and the more the flow velocity can be heightened when the continuous porous structure is used as a channel for gases or liquids. Meanwhile, the lower the average porosity thereof, the higher the resistance to forces applied in cross-sectional directions, such as compression and bending, and hence the more the material is advantageous in terms of handleability and use under pressure. In view of these, the average porosity of the continuous porous structure is preferably in the range of 15 to 75%, more preferably in the range of 18 to 70%.

It is preferable that the above-mentioned continuous porous structure has at least one peak diameter in the range of 5 to 400 nm in a pore diameter distribution curve thereof. The pore diameter distribution is determined by the mercury intrusion method or the gas adsorption method. The mercury intrusion method is suitable for acquiring the pore diameter distributions of materials having a long structural period because pore diameter distribution curves in a wide range of 5 nm to 500 μm can be acquired therewith. In contrast, the gas adsorption method is suitable for acquiring pore diameter distributions in a range of up to about 100 nm, which is small as compared with that in the mercury intrusion method. For determining a pore diameter distribution, either the mercury intrusion method or the gas adsorption method can be suitably selected in accordance with the structural period of the porous carbon material of the present invention.

The smaller the value of the peak diameter in the pore diameter distribution curve, the shorter the distance between the porous carbon material and the material of another kind composited therewith. Especially in the range of about tens of nanometers or lower, it is easy to form a state in which a current is apt to flow between the material of another kind and the porous carbon material of the present invention, because of the quantum tunnel effect. Meanwhile, the larger the value of the peak diameter in the pore diameter distribution curve, the easier the compositing with particles having a large diameter, etc. In view of these, the peak diameter in the pore diameter distribution curve of the porous carbon material of the present invention is more preferably in the range of 5 to 350 nm, even more preferably in the range of 5 to 300 nm.

Incidentally, even in the case where the porous carbon material has a portion having substantially no continuous porous structure, the pore diameter distribution of the continuous porous structure can be determined by determining the pore diameter distribution of the whole material. The pore diameter distribution curve of the continuous porous structure can be approximated by the pore diameter distribution curve of the whole material.

The shorter the structural period, the finer the structure and the larger the surface area per unit volume or unit weight. For example, in the case where a catalyst is fixed, the efficiency of contact between the catalyst and a fluid is remarkably heightened. Meanwhile, the longer the structural period, the more the pressure loss can be reduced and the more a fluid can be filled and/or passed. It is hence preferable that the above-mentioned structural period should be set arbitrarily in accordance with the application in which the porous carbon material is to be used.

[Carbon Crystal Grains]

The porous carbon material of an embodiment of the present invention contains carbon crystal grains. The carbon crystal grains are grains of which a main constituent is carbon crystal, such as graphite crystal and diamond crystal as described later.

The inclusion of carbon crystal grains enables the porous carbon material of the present invention to heighten thermal conductivity and electrical conductivity through the carbon crystal grain portion. Further, the carbon crystal grain tends to have a high elastic modulus as compared with a portion which is substantially amorphous other than the carbon crystal grains. Hence, there is significant improvement observed in the elastic modulus and compressive strength of the whole porous carbon material of the present invention. Therefore, for example, in the case where the porous carbon material of the present invention is used in an electrode material which significantly changes in volume at the time of charging and discharging, the porous carbon material is not ruptured along with the volume change. Therefore, even though the charging and discharging are repeated, the porous carbon material rarely changes the basic battery property, such as a charge-and-discharge capacity. Further, in the case where the porous carbon material of the present invention has the form of a fiber or a film, this material is not easily ruptured and allows a final product having excellent quality to be efficiently produced at the time of handling, modularizing, an assembly step, etc.

Although the carbon crystal grain size is not particularly limited, the smaller the carbon crystal grain size, the more the absolute distance between the carbon crystal grains tends to approach one another, and the carbon crystal grain allows the conductivity and thermal conductivity to improve without significantly changing the mechanical property. Further, the larger the size thereof, the more the capability of incorporating an ion or the like in the carbon crystal grain is heightened. Therefore, when a metal such as lithium is intercalated in the carbon crystal grain, the efficiency of such intercalation can be heightened. In view of these, the carbon crystal grain size is preferably in the range of 1 to 1000 nm. In particular, when the carbon crystal grain size is in the range of 1 to 100 nm, the mechanical property, and conductivity and thermal conductivity are in excellent balance. This configuration is hence preferred. Further, when the carbon crystal grain size is in the range of 50 to 1000 nm, the efficiency of the intercalation can be heightened, so that the carbon crystal grain can provide a preferable property of particularly an electrode material.

Figure 2:
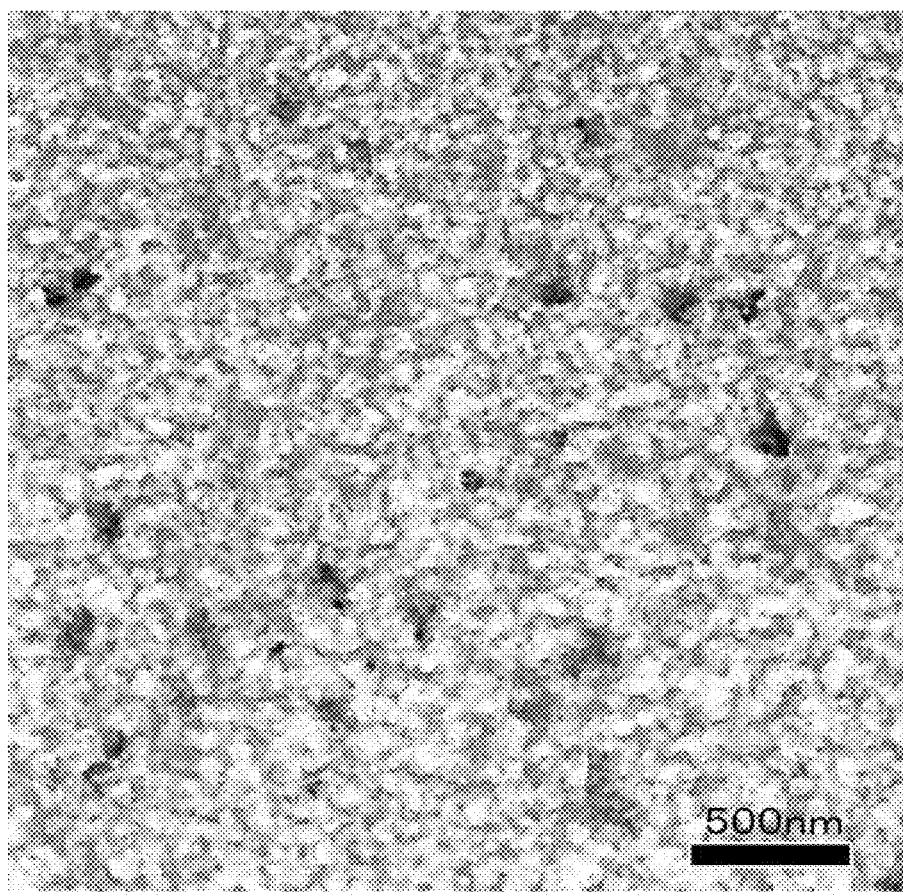
FIG. 2 illustrates a transmission electron photomicrograph of the porous carbon material of Example 1.
Figure 3:
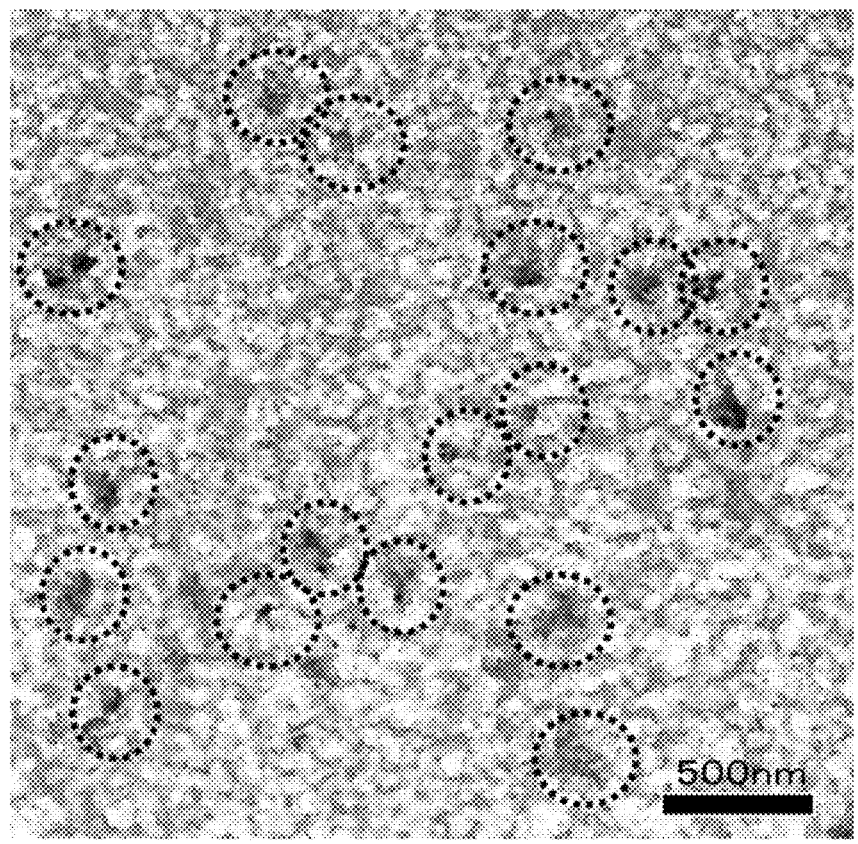
FIG. 3 illustrates carbon crystal grains in the transmission electron photomicrograph of the porous carbon material of Example 1.

When the porous carbon material of the present invention is thinly cut out using a convergence ion beam or the like, and the cut-out piece is then observed with a transmission electron microscope or the like, the presence or absence of the carbon crystal grain can be confirmed with black contrasts as shown in FIG. 2. FIG. 3 shows the carbon crystal grains of FIG. 2 surrounded with dashed lines. The carbon crystal grain is present in a region having a low luminance as compared with the other places. As for the carbon crystal grain, first, a median filter having a radius of 2 pixels is applied to a photographed image, a luminance histogram of the image is then obtained, the luminance value is divided by the maximum frequency value near the median, and the resultant value is expressed as the frequency by percentage. Straight line approximation is performed using the value of a point at which the frequency from the dark side where the luminance value is low exceeds 20% and the value of a point at which the frequency exceeds 50%, and the luminance value at the time of setting the frequency to 0% is calculated from the formula of the straight line thus obtained (the x fragment is calculated when the luminance and the frequency are regarded as x and y, respectively). A group of pixels having lower luminance values than the resultant luminance value represents the carbon crystal grain. Here, among the group of pixels, less than 30 pixels which are recognized as noises are excluded from those representing the carbon crystal grain.

Each of the carbon crystal grain size can be determined by obtaining an area of the black contrast portion and converting the area to a diameter of a circle equivalent to the area. The term "carbon crystal grain size" simply described herein means a number average value, and specifically, the carbon crystal grain size can be determined by the method described in Example to be described later.

A proportion, in which the area of the black contrast portion accounts for the whole area used for the analysis, is referred to as an existence proportion of the carbon crystal grain. The existence proportion of the carbon crystal grain is preferably 0.1% or more. Not less than 0.1% of such existence proportion thereof allows conductivity and thermal conductivity to be sufficiently imparted to the material. The upper limit of the existence proportion of the carbon crystal grain is not particularly limited. However, when the upper limit thereof is less than 70%, the mechanical property, and conductivity and thermal conductivity are in excellent balance. This configuration is hence preferred.

The carbon crystal which constitutes the carbon crystal grain of the present invention means a carbon portion having a crystal structure with a unit cell or having a structure in which the crystal structure is slightly irregular. A so-called perfect crystal may be a graphite crystal or a diamond crystal. The measurement method is as described later. In the present invention, the measured crystal structure may be slightly irregular.

When the carbon crystal is a graphite crystal or has a slightly irregular structure of a graphite crystal, it becomes possible to sufficiently heighten the conductivity and thermal conductivity of the porous carbon material as compared with the amorphous portion. Therefore, it is suitable for electrode applications for which these properties are particularly required. Further, when the carbon crystal is a diamond crystal or has a slightly irregular structure of a diamond crystal, it becomes possible to significantly heighten the mechanical properties such as tension and compression as compared with the amorphous portion, and the elastic modulus and strength can also be easily balanced. Therefore, it is suitable for applications of structural materials for which these properties are particularly required, high compressive separation membranes, etc.

Whether the carbon crystal is a graphite crystal or has a slightly irregular structure of a graphite crystal can be judged when the X-ray diffraction profile measured by a powder method has a peak near a diffraction angle of 24.5 to 26.6°. In particular, in the case where the carbon crystal has a slightly irregular structure of a graphite crystal, conductivity, thermal conductivity, and mechanical property can be easily balanced. This embodiment is hence preferred. In the case where the carbon crystal has a slightly irregular structure of a graphite crystal, it can be judged by whether the X-ray diffraction profile measured by a powder method has a peak between diffraction angles of 25 to 26°.

Whether the carbon crystal is a diamond crystal or has a slightly irregular structure of a diamond crystal can be judged when the X-ray diffraction profile measured by a powder method has a peak near a diffraction angle of 42 to 45°.

Although the carbon crystal grains may be contained in the branches which constitute a continuous porous structure or may be contained in the other portions, it is preferable that at least a portion of the carbon crystal grains is contained in the branches which constitute a continuous porous structure. When the carbon crystal grains are present in the branches which constitute a continuous porous structure, the function to mediate conductivity and thermal conductivity can be remarkably exhibited and it also becomes easy to improve the mechanical property of the whole porous carbon material. In particular, by including the carbon crystal grains in the branches which constitute the continuous porous structure, the carbon crystal grains become close in physical distance to the pores which constitute the continuous porous structure. Therefore, when the carbon crystal grains exhibit the function due to a contact with, for example, an electrolytic solution, an emulsion, a solution, or the like, adsorption, desorption, reaction, etc. can be efficiently proceeded.

In the energy dispersive X-ray spectrometry measurement of the carbon crystal grain portion observed with the above-mentioned transmission electron microscope, the existence proportion of the carbon atom is calculated from the X-ray intensity equivalent to the carbon atom, and the existence proportion of the carbon atom in the carbon crystal grain of the invention is preferably 50% or more. When the existence proportion of the carbon atom is not less than 50%, it is possible to maintain the conductivity and thermal conductivity of the carbon crystal grain sufficiently high. From this standpoint, the existence proportion of the carbon atom is preferably 70% or more, more preferably 90% or more.

[Portion Having Substantially No Continuous Porous Structure]

The porous carbon material of the present invention may have a portion having substantially no continuous porous structure. The term "portion having substantially no continuous porous structure" means a portion in which any pores have a size less than the resolution and hence no distinct pores are observed when a cross-section formed by the cross-section polisher method (CP method) is examined at a magnification resulting in 1±0.1 (nm/pixel). In the case where the portion in which no distinct pores are observed is present over an area that is not less than the region of a square in which each side corresponds to three times the structural period L calculated from X-ray analysis as will be described later, the portion having substantially no continuous porous structure is present.

The portion having substantially no continuous porous structure does not have the effect which is characteristic of the continuous porous structure. In the portion having substantially no continuous porous structure, however, the carbon is densely packed and the electronic conductivity is hence enhanced. Consequently, the electrical conductivity and the thermal conductivity can be maintained on or above a certain level. Because of this, in the case where the porous carbon material which has a portion having substantially no continuous porous structure is used, for example, as a battery material, it is possible to rapidly discharge the heat of reaction from the system and to keep the resistance to electron transfer low. Consequently, a contribution to the production of high-efficiency batteries can be attained. In addition, the presence of the portion having no continuous porous structure also provides an advantage in that it is possible to remarkably heighten the resistance to, in particular, compressive rupture.

The carbon crystal grains may be contained in the portion having substantially no continuous porous structure. The presence of the carbon crystal grains allows conductivity and thermal conductivity to be secured and can exhibit preferable properties as sites for intercalations, such as metal ions. In particular, due to the presence of the carbon crystal grains in the portion having substantially no continuous porous structure, a pseudo network between the carbon crystal grains through portions other than the carbon crystal grains is formed. Therefore, it becomes possible to heighten the resistance to physical forces, such as compression and tension. The heightened resistance is hence preferred.

Meanwhile, the porous carbon material of the present invention is suitably used as a column material for HPLC to provide a column having a high degree of fractionating properties. Furthermore, fixing a catalyst to the surface of the portion having the continuous porous structure can contribute to application of the porous carbon material to microreactors, exhaust gas purification catalysts, and the like in which the portion having no continuous porous structure serves to control.

The proportion of the portion having no continuous porous structure is not particularly limited, and can be regulated arbitrarily in accordance with applications. However, in the case where the porous carbon material is used as a fractionating material in which the portion having no continuous porous structure serves as a wall surface or in the case where the porous carbon material is used as a battery material, it is preferable in either case that the portion having no continuous porous structure accounts for 5% by volume or more. This is because this configuration can prevent the fluid from leaking out from the continuous porous structure of the present invention, while maintaining the fractionating properties, or makes it possible to maintain electrical conductivity and thermal conductivity on a high level.

In the case where the porous carbon material of the present invention has a configuration in which the portion having no continuous porous structure is formed around the portion having the continuous porous structure so as to cover the portion having the continuous porous structure, it is preferable because it is possible to more efficiently fill and/or pass a fluid into or through the pores which constitute the continuous porous structure and the porous carbon material is excellent in strength. While in the following, the porous carbon material of this configuration will be described in this description, the portion having the continuous porous structure is referred to as "core layer" and the portion having no continuous porous structure which covers the core layer is referred to as "skin layer".

[Core Layer]

The core layer is a layer which has a continuous porous structure. In the case where the porous carbon material has such a structure, it is easy to immerse another material into the continuous porous structure from a cross-section of the material which is, for example, in the form of a fiber or a film. In addition, this material can be utilized as a path for causing substances to pass therethrough. It is, therefore, possible to utilize this material as a channel of a column for separation or as a gas channel of a gas separation membrane.

Furthermore, since the continuous porous structure of the present invention can form an even and continuous structure, the porous carbon material is excellent in mechanical property regarding compression, bending, tension, etc., and the structure contributes to improvement in the brittleness which is characteristic of carbonized materials, as compared with particulate carbon materials having the same porosity.

It is preferable that the continuous porous structure of the core layer is formed so that a central part thereof has a structural period of 0.002 µm to 1 µm. The term "central part" herein means the gravity center on the assumption that the mass distribution in the cross-section of the porous carbon material is even. In the case of a powder particle, for example, the gravity center thereof is the central part. In the case where the material is in the form of a fiber which has a round cross-section, the "central part" indicates a point where the distances from the fiber surface are the same in a cross-section of the fiber perpendicular to the fiber axis. However, in the case of a film shape in which it is difficult to clearly define the gravity center thereof, the "central part" thereof is defined as follows. That is, a vertical line is drawn from the film surface in the cross-section perpendicular to TD or MD direction. Then, an aggregate of points which are placed at one-half of the film thickness on the vertical line is defined as the "central part". Similarly, in the case of a hollow fiber in which the gravity center thereof is not within the material, the "central part" thereof is defined as follows. That is, a vertical line is drawn from the tangent line of the outer surface of the hollow fiber. Then, an aggregate of points which are placed at one-half of the material thickness on the vertical line is defined as the "central part".

[Skin Layer]

The term "skin layer" means the layer which is formed around the core layer and has substantially no continuous porous structure.

The thickness of the skin layer is not particularly limited, and can be suitably selected in accordance with applications of the material. In the case where the skin layer is too thick, this porous carbon material tends to have a reduced porosity. Consequently, the thickness thereof is preferably 100 μm or less, more preferably 50 μm or less, most preferably 20 μm or less. Although there is no particular lower limit thereon, the thickness of the skin layer is preferably 1 nm or larger from the standpoints of maintaining the shape of the material and making the skin layer exhibit a function different from that of the core layer.

The porous carbon material of the present invention as described above is capable of having an asymmetrical structure including a core layer and a skin layer. In the case where the porous carbon material having such an asymmetrical structure is composited with another material to obtain a composite material, it is possible to produce a composite material in which the skin layer part has not been filled with the material of another kind and the continuous porous structure of the core layer only has been filled with the material of another kind. Such a composite material can be configured so that the skin layer part exhibits the properties possessed by the carbon material itself, such as chemical stability, and thermal and electrical conductivity, and that various functional materials are fixed to the core layer, and is thought to be used in a wide range of applications including battery materials, catalyst supports, and fiber-reinforced composite materials. Furthermore, since this porous carbon material has an asymmetrical structure including a skin layer and a core layer, efficient filtration and separation is made possible when the porous carbon material is used, for example, in separation membrane applications by using the skin layer as a separation functional layer and the core layer as a channel for fluids. This embodiment is hence preferred.

[Shape of Porous Carbon Material]

The shape of the porous carbon material of the present invention is not particularly limited, and examples thereof include a bulk shape, rod shape, flat plate shape, disk shape, and spherical shape. Of these, in preferred embodiments, the porous carbon material is in the form of a fiber, film, or powder.

The term "in the form of a fiber" means a shape in which the average length is at least 100 times the average diameter. The material may be filaments or long fibers, or may be staples, short fibers, or chopped strands. The shape of the cross-section thereof is not limited at all, and the cross-section can have any shape such as a round cross-section, a multi-leafed cross-section, e.g., triangular cross-section, a flat cross-section, or a hollow cross-section.

In the case where the material is in the form of a fiber, it is possible to fill or pass a fluid into or through the portion having the continuous porous structure. Especially, in the case where an electrolytic solution is passed, efficient electrochemical reactions can be induced in the continuous porous structure. Furthermore, when a fluid is filled or passed at a high pressure, this material shows high compressive resistance because the material has such a structure that the branches which constitute the portion having the continuous porous structure support one another.

The porous carbon material in the form of a fiber is excellent in fractionating properties as a fractionating column material because adsorption and desorption occur on the surface of the branches which constitute the continuous porous structure. Furthermore, due to the presence of the skin layer, the material can have electrical conductivity and thermal conductivity in combination, making it easy to remove the heat of reaction which accompanies the electrochemical reactions described above. In addition, when this material is used as a fractionating column material, the deformation which may be caused by pressurization due to the pressure loss of the fluid can be minimized and the fractionating column material can show stable performance.

In particular, in the case where the porous carbon material in the form of a fiber is formed of a core layer having a continuous porous structure and a skin layer which is formed so as to cover around the core layer and has substantially no continuous porous structure, and where this material is used, for example, as a separation membrane for fluids, the fibers themselves can be fabricated into a module. This configuration makes it easy to pass a fluid through the voids of the core layers to cause the material to perform a separating function at the interface between the core layer and the skin layer. Furthermore, this configuration has advantages in that it is possible to attain a larger membrane area per unit volume as compared with flat membranes, or the like. In addition, since this material has enhanced resistance to forces applied in cross-sectional directions, the module can be operated at high pressures, making high-efficiency membrane separation possible. This configuration is hence preferred. Moreover, a module including the material is suitable also for use as a column for separation in high-performance liquid chromatograph or the like. Further, the structural evenness is high and the specific surface area is large because an even continuous porous structure is formed in the core layer. Because of this, the separating performance can be remarkably heightened without heightening the pressure loss which is a burden to the operation.

In the case where the material is used in the form of short fibers, it is easy to composite this material by melt-kneading the material together with a resin serving as a matrix thereby immersing the matrix resin into the pores of the portion having the continuous porous structure. In the case where the porous carbon material of the present invention which is in such a form is used, the material has a larger area contacting with the matrix as compared with general short carbon fibers and can also exhibit a strong anchor effect by filling continuous voids with resin, making it possible to easily improve the mechanical properties to attain high strength and high elastic modulus.

In the case where the cross-sectional shape of the fiber is a hollow cross-section, another material can be filled into the hollow part and, hence, this material is applicable, for example, to battery materials and the like by filling with an electrolytic solution or an active material. In addition, the material can be used as a hollow-fiber membrane for separating substances. The shape of the hollow part is not particularly limited, and the hollow part can have any shape such as a round cross-section, a multi-leafed cross-section, e.g., triangular cross-section, a flat cross-section, or a shape having a plurality of hollow parts.

The average diameter of the fibers is not particularly limited, and can be determined arbitrarily in accordance with applications. The average diameter thereof is preferably 10 nm or larger from the standpoint of maintaining the handleability and porousness. From the standpoint of ensuring flexural rigidity to improve the handleability, the average diameter thereof is preferably 5,000 μm or less.

In the case where the porous carbon material of the present invention is in the form of a film, the portion having a continuous porous structure can be composited with another material and the resultant composite can be used as it is as a sheet. This porous carbon material is hence suitable for use in applications such as electrodes among battery materials and electromagnetic shielding materials. Especially, in the case where this material is a film which has a core layer having a continuous porous structure and a skin layer having substantially no continuous porous structure on one-side or both-side surfaces thereof, the skin layer can retain electrical conductivity and thermal conductivity on a high level and functions as an interface which is suitable, for example, for adhesion to other materials. This embodiment is hence preferred. In the case where this material has a configuration in which the skin layer is formed only on one surface of the film, it is easy to composite the core layer, which is the portion having the continuous porous structure, with another material.

The thickness of the film is not particularly limited, and can be determined arbitrarily in accordance with applications. However, the thickness thereof is preferably 10 nm or larger when handleability is taken into account, and is preferably 5,000 μm or less from the standpoint of preventing damages due to flexing.

In the case where the porous carbon material is in the form of a powder, this material can be applied, for example, to battery materials, etc. The portion having no continuous porous structure accounts for some of each of the particles constituting the powder, i.e., some of each particle. Because of this, the electrical conductivity and thermal conductivity within the particle can be remarkably heightened. In addition, the compressive strength of the particle itself can be heightened, thereby inhibiting performance deterioration from occurring at high pressures. Furthermore, not only the electrical conductivity and thermal conductivity can be heightened, but also the portions having no continuous porous structure of the respective particles come into contact with one another, thereby making it possible to further heighten the electrical conductivity and thermal conductivity. Further, a fluid that flows through the powder passes along the portions having no continuous porous structure. As a result, the channels are complicated, and the fluid can be efficiently mixed. The portions having no continuous porous structure can thus impart properties which make the porous carbon material suitable for use as a separation column packing material. This material is hence a preferred embodiment.

It is preferable that, in the porous carbon material in the form of a powder, the proportion of the portion having no continuous porous structure is 5% by volume or higher from the standpoint of enabling the material to exhibit the above-mentioned properties. The proportion of the portion having no continuous porous structure can be determined by conventionally known analytical techniques. It is preferable that the three-dimensional shape of each particle is determined by electron-beam tomography, X-ray micro-CT, or the like and the proportion is then calculated from the volume of the portion having the continuous porous structure and that of the portion having no continuous porous structure.

In the case where each of the particles constituting the powder includes a core layer having the continuous porous structure and a skin layer which is formed so as to cover around the core layer and has substantially no continuous porous structure, this material can be used as a lightweight filler of hollow particles.

The particle size of the powder is not particularly limited, and can be suitably selected in accordance with applications. The particle size in the range of 10 nm to 10 mm is preferable because the material can be handled as a powder. In particular, the powder having a particle size of 10 μm or less, when used, for example, as a solid ingredient for constituting a paste, gives an exceedingly smooth paste and, hence, this paste can be prevented from causing defects such as paste peeling or cracking in steps of application or the like. Meanwhile, the powder having a particle size of 0.1 μm or larger, when used for producing composite materials with resins, can sufficiently exhibit as a filler the effect of improving strength. This material is hence a preferred embodiment.

<Process for Producing Porous Carbon Material>

The porous carbon material of the invention can be produced, for example, by a production process including: a step in which a carbonizable resin and an eliminable resin are brought into a compatibly mixed state to obtain a resin mixture (step 1); a step in which the resin mixture in a compatibly mixed state is caused to undergo phase separation and the separated phases are fixed (step 2); and a step in which the fixed material is carbonized by pyrolysis under heat (step 3).

[Step 1]

Step 1 is a step in which 10 to 90% by weight of a carbonizable resin and 90 to 10% by weight of an eliminable resin are brought into a compatibly mixed state to obtain a resin mixture.

The carbonizable resin is a resin which carbonizes upon pyrolysis and remains as a carbon material, and both a thermoplastic resin and a thermosetting resin can be used. In the case of a thermoplastic resin, it is preferred to select a resin which can be made infusible by a simple process such as heating or irradiation with high-energy rays. In the case of a thermosetting resin, there are many cases where a treatment for imparting infusibility is unnecessary, and thermosetting resins are also included in suitable materials. Examples of the thermoplastic resin include polyphenylene oxide, polyvinyl alcohol, polyacrylonitrile, phenolic resins, and wholly aromatic polyesters. Examples of the thermosetting resin include unsaturated polyester resins, alkyd resins, melamine resins, urea resins, polyimide resins, diallyl phthalate resins, lignin resins, and urethane resins. These resins may be used either alone or in a mixed state. It is a preferred embodiment from the standpoint of ease of molding that thermoplastic resins are mixed with each other or thermosetting resins are mixed with each other.

It is a preferred embodiment that thermoplastic resins are used among those from the standpoints of carbonization yield, moldability, and economic efficiency. Of these, polyphenylene oxide, polyvinyl alcohol, polyacrylonitrile, and wholly aromatic polyesters are suitably used.

Meanwhile, the eliminable resin is a resin to be eliminated subsequently to the step 2 to be described later, and can be removed in any of the following stages: simultaneously with a treatment for imparting infusibility; after the treatment for imparting infusibility; and simultaneously with the pyrolysis. Methods for removing the eliminable resin are not particularly limited. Suitable methods include: a method in which the eliminable resin is chemically removed, for example, by conducting depolymerization using a chemical; a method in which the eliminable resin is dissolved away by adding a solvent capable of dissolving the eliminable resin; and a method in which the resin mixture is heated to lower the molecular weight of the eliminable resin by thermal decomposition, thereby removing the eliminable resin. These techniques can be used alone or in combination thereof. In the case of using a combination, the techniques may be simultaneously performed or separately performed.

As the method in which the resin is chemically removed, a method in which the resin is hydrolyzed using an acid or an alkali is preferred from the standpoints of economic efficiency and handleability. Examples of resins which are susceptible to hydrolysis by acids or alkalis include polyesters, polycarbonates, and polyamides.

Preferred examples of the method in which the eliminable resin is removed by adding a solvent capable of dissolving the eliminable resin include: a method in which the solvent is continuously supplied to the carbonizable resin and eliminable resin which have been mixed, thereby dissolving and removing the eliminable resin; and a method in which the solvent and the resins are mixed batchwise to dissolve and remove the eliminable resin.

Specific examples of the eliminable resin which are suitable for the method of removing by solvent addition include polyolefins such as polyethylene, polypropylene, and polystyrene, acrylic resins, methacrylic resins, polyvinylpyrrolidone, aliphatic polyesters, and polycarbonates. Of these, amorphous resins are preferred from the standpoint of solubility in the solvent. Examples thereof include polystyrene, methacrylic resins, polycarbonates, and polyvinylpyrrolidone.

Examples of the method in which the eliminable resin is lowered in molecular weight by thermal decomposition and removed thereby include: a method in which the carbonizable resin and eliminable resin that have been mixed are heated batchwise to decompose the eliminable resin; and a method in which the carbonizable resin and eliminable resin that have been continuously mixed are continuously supplied to a heating source and heated to thereby decompose the eliminable resin.

It is preferable that the eliminable resin is, among those resins, a resin that disappears in the step 3, which will be described later, through thermal decomposition when the carbonizable resin is carbonized by pyrolysis. It is preferable that the eliminable resin is a thermoplastic resin that does not undergo a large chemical change when the carbonizable resin is subjected to the treatment for imparting infusibility, which will be described later, and that, after pyrolysis, gives a carbonization yield of less than 10%. Specific examples of such eliminable resins include polyolefins such as polyethylene, polypropylene, and polystyrene, acrylic resins, methacrylic resins, polyacetals, polyvinylpyrrolidone, aliphatic polyesters, aromatic polyesters, aliphatic polyamides, and polycarbonates. These resins may be used either alone or in a mixed state.

In the step 1, the carbonizable resin and the eliminable resin are brought into a compatibly mixed state to obtain a resin mixture (polymer alloy). The expression "brought into a compatibly mixed state" herein means that by suitably selecting conditions regarding temperature and/or solvent, a state that no structure in which the carbonizable resin and the eliminable resin are present as separate phases is observed with an optical microscope, is produced.

The carbonizable resin and the eliminable resin may be brought into a compatibly mixed state by mixing the resins alone with each other or by further adding a solvent thereto.

Examples of a system in which a plurality of resins have been brought into a compatibly mixed state include: a system which shows a phase diagram of the upper-limit critical solution temperature (UCST) type in which the resins are in a phase-separated state at low temperatures but form a single phase at high temperatures; and a system which conversely shows a phase diagram of the lower-limit critical solution temperature (LOST) type in which the resins are in a phase-separated state at high temperatures but form a single phase at low temperatures. Furthermore, especially in the case of a system in which at least one of the carbonizable resin and the eliminable resin has been dissolved in a solvent, preferred examples include one in which the phase separation, which will be described later, is induced by the infiltration of a nonsolvent.

The solvent to be added is not particularly limited. Preferred is such a solvent that the absolute value of the difference between the solubility parameter (SP value) thereof and the average of the SP values of the carbonizable resin and eliminable resin is 5.0 or less, the absolute value being an index to dissolving properties. It is known that the smaller the absolute value of the difference from the average of the SP values, the higher the dissolving properties. It is therefore preferable that the difference is zero. Meanwhile, the larger the absolute value of the difference from the average of the SP values, the lower the dissolving properties and the more the compatibly mixed state of the carbonizable resin and eliminable resin is difficult to attain. In view of this, the absolute value of the difference from the average of the SP values is preferably 3.0 or less, most preferably 2.0 or less.

Specific examples of combinations of carbonizable resin and eliminable resin to be brought into a compatibly mixed state, in the case where the system contains no solvent, include polyphenylene oxide/polystyrene, polyphenylene oxide/styrene-acrylonitrile copolymer, wholly aromatic polyester/polyethylene terephthalate, wholly aromatic polyester/polyethylene naphthalate, and wholly aromatic polyester/polycarbonate. Specific examples of the combinations, in the case where the system contains a solvent, include polyacrylonitrile/polyvinyl alcohol, polyacrylonitrile/polyvinylphenol, polyacrylonitrile/polyvinylpyrrolidone, polyacrylonitrile/polylactic acid, polyvinyl alcohol/vinyl acetate-vinyl alcohol copolymer, polyvinyl alcohol/polyethylene glycol, polyvinyl alcohol/polypropylene glycol, and polyvinyl alcohol/starch.

Methods for mixing the carbonizable resin with the eliminable resin are not limited, and various known mixing techniques can be employed so long as even mixing is possible therewith. Examples thereof include a rotary mixer having stirring blades and a kneading extruder with screws.

It is a preferred embodiment that the temperature (mixing temperature) at which the carbonizable resin and the eliminable resin are mixed together is not lower than a temperature at which both the carbonizable resin and the eliminable resin soften. As the temperature at which the resins soften, either the melting point of the carbonizable resin or eliminable resin in the case where the resin is a crystalline polymer or the glass transition temperature thereof in the case where the resin is an amorphous resin may be suitably selected. By setting the mixing temperature at a temperature not lower than the temperature at which both the carbonizable resin and the eliminable resin soften, the viscosity of the two resins can be lowered and, hence, more efficient stirring and mixing are possible. There is no particular upper limit on the mixing temperature, but the temperature is preferably 400° C. or lower from the standpoint of preventing resin deterioration due to thermal degradation, thereby obtaining a precursor for the porous carbon material, which has excellent quality.

In the step 1, 10 to 90% by weight of the carbonizable resin is mixed with 90 to 10% by weight of the eliminable resin. In the case where the proportions of the carbonizable resin and eliminable resin are within those ranges, an optimal pore size and an optimal porosity can be arbitrarily designed. Those proportion ranges are hence preferred. When the proportion of the carbonizable resin is 10% by weight or larger, it is possible to retain mechanical strength in the carbonized material, and it is also possible to improve yield, so that the proportions are preferred. Meanwhile, when the proportion of the carbonizable material is 90% by weight or less, the eliminable resin can efficiently form voids, so that the proportions are preferred.

A mixing ratio between the carbonizable resin and the eliminable resin can be arbitrarily selected within the range while taking account of the compatibility of each material. Specifically, since compatibility between resins generally becomes worse as the ratio therebetween approaches 1:1, preferred embodiments in the case where a system having not so high compatibility has been selected as starting materials include one in which the compatibility is improved by making the mixture approach to the so-called partial composition by increasing or reducing the amount of the carbonizable resin.

It is also a preferred embodiment that a solvent is added when the carbonizable resin and the eliminable resin are mixed with each other. The addition of a solvent not only lowers the viscosity of the carbonizable resin and eliminable resin to facilitate molding but also makes the carbonizable resin and the eliminable resin easy to bring into a compatibly mixed state. The solvent referred to herein is not also particularly limited, and any solvent which is liquid at ordinary temperature and in which at least one of the carbonizable resin and the eliminable resin is soluble or swellable may be used. It is a more preferred embodiment that a solvent in which both the carbonizable resin and the eliminable resin dissolve is used because the compatibility between both resins can be improved.

It is preferable that the amount of the solvent to be added is 20% by weight or larger based on the total weight of the carbonizable resin and the eliminable resin, from the standpoints of improving the compatibility between the carbonizable resin and the eliminable resin and lowering the viscosity thereof to improve the flowability. Meanwhile, from the standpoint of the cost of the recovery and recycling of the solvent, the amount of the solvent to be added is preferably 90% by weight or less based on the total weight of the carbonizable resin and the eliminable resin.

[Step 2]

The step 2 is a step in which the resin mixture that has been brought into a compatibly mixed state in the step 1 is caused to undergo phase separation to form a microstructure and this microstructure is fixed.

Methods by which the carbonizable resin and eliminable resin that have been mixed together are caused to undergo phase separation are not particularly limited. Examples thereof include: a heat-induction phase separation method in which phase separation is induced by a temperature change; a nonsolvent-induction phase separation method in which phase separation is induced by adding a nonsolvent; and a reaction-induction phase separation method in which phase separation is induced using a chemical reaction.

These phase separation methods can be used alone or in combination thereof. Specific examples of methods in the case of using a combination include: a method in which the mixture is passed through a coagulating bath to cause nonsolvent-induced phase separation and the mixture is then heated to cause heat-induced phase separation; a method in which nonsolvent-induced phase separation and heat-induced phase separation are simultaneously caused by controlling the temperature of a coagulating bath; and a method in which the material ejected from a spinning nozzle is cooled to cause heat-induced phase separation and is then brought into contact with a nonsolvent.

It is also a preferred embodiment that the above-mentioned phase separation is accompanied with no chemical reaction. The expression "accompanied with no chemical reaction" herein means that either of the carbonizable resin and eliminable resin which have been mixed undergoes no change in primary structure before and after the mixing. The term "primary structure" means the chemical structure which constitutes the carbonizable resin or the eliminable resin. In the case where the phase separation is accompanied with no chemical reaction, the mechanical and chemical properties of the carbonizable resin and/or eliminable resin are not impaired and, hence, a structure body of any shape such as a fiber or film shape can be molded without considerably changing the molding conditions. This embodiment is hence preferred. Especially in the case where a microstructure has been formed through phase separation without causing a crosslinking reaction or the like and the microstructure has been fixed, considerable increase in elastic modulus due to crosslinking reaction and decrease in flexibility are not observed and a flexible structure can be maintained during molding. Because of this, excellent passability through steps for fiber or film production can be obtained without being led to thread breakage or film rupture.

[Removal of Eliminable Resin]

It is preferable that the resin mixture in which a microstructure resulting from the phase separation has been fixed in the step 2, is subjected to removal of the eliminable resin before being subjected to the carbonization step (step 3). Methods for the removal of the eliminable resin are not particularly limited, and any method may be used so long as the eliminable resin can be decomposed and removed thereby. Specifically, suitable methods include: a method in which the eliminable resin is chemically decomposed and lowered in molecular weight using an acid, alkali, or enzyme and is removed thereby; a method in which the eliminable resin is dissolved away with the addition of a solvent capable of dissolving the eliminable resin; and a method in which the eliminable resin is depolymerized using radiation, such as electron beams, gamma rays, ultraviolet rays, or infrared rays, to thereby remove the eliminable resin.

Especially, in the case where the eliminable resin can be thermally decomposed, a heat treatment may be conducted beforehand at such a temperature that at least 80% by weight of the eliminable resin disappears, or the eliminable resin may be gasified by thermal decomposition and then removed simultaneously with heat treatment in the carbonization step (step 3) or in the treatment for imparting infusibility which will be described later. It is a more suitable embodiment that the method is selected in which the eliminable resin is gasified by thermal decomposition and then removed simultaneously with heat treatment in the carbonization step (step 3) or in the treatment for imparting infusibility which will be described later, from the standpoint of reducing the number of steps to heighten the productivity. In particular, the eliminable resin is removed simultaneously with carbonization in the carbonization step (step 3). Such removal is a preferred embodiment because not only a cost reduction due to the reduction in the number of steps but also an improvement in yield are expected.

[Treatment for Imparting Infusibility]

It is preferable that the resin mixture in which a microstructure resulting from the phase separation has been fixed in the step 2, or the resultant obtained by which the resin mixture is further subjected to the above-mentioned decomposition treatment as required is subjected to a treatment for imparting infusibility before being subjected to the carbonization step (step 3). Methods for the treatment for imparting infusibility are not particularly limited, and known methods can be used. Specific examples of the methods include: a method in which the resin mixture is heated in the presence of oxygen to thereby cause oxidative crosslinking; a method in which the resin mixture is irradiated with high-energy rays such as electron beams or gamma rays to form a crosslinked structure; and a method in which a substance having a reactive group is immersed or mixed to form a crosslinked structure. Of these, the method in which the resin mixture is heated in the presence of oxygen to thereby cause oxidative crosslinking is preferred because the process is simple and the production cost can be reduced. These techniques can be used alone or in combination thereof, and the techniques may be used either simultaneously or separately.

The heating temperature in the method in which the resin mixture is heated in the presence of oxygen to thereby cause oxidative crosslinking is preferably a temperature of 150° C. or higher from the standpoint of causing the crosslinking reaction to proceed efficiently, but is preferably a temperature of 350° C. or lower from the standpoint of preventing the yield from being impaired by a weight loss due to the thermal decomposition, oxidative decomposition, combustion, etc. of the carbonizable resin.

There are no particular limitations on oxygen concentration during the treatment. However, a preferred embodiment is one in which a gas having an oxygen concentration of 18% or higher is supplied, in particular, air is supplied as it is, because use of such a gas makes it possible to reduce the production cost. Methods for supplying the gas are not particularly limited, and examples thereof include a method in which air is supplied as it is to the heating device and a method in which pure oxygen is supplied to the heating device using a bomb or the like.

Examples of the method in which the resin mixture is irradiated with high-energy rays such as electron beams or gamma rays to form a crosslinked structure include a method in which a commercially available electron beam generator or gamma ray generator is used to irradiate the carbonizable resin with electron beams or gamma rays to thereby induce crosslinking. A lower limit of the irradiation intensity is preferably 1 kGy or higher from the standpoint of efficiently introducing a crosslinked structure by the irradiation, and the irradiation intensity is preferably 1,000 kGy or less from the standpoint of preventing the material strength from being reduced by a decrease in molecular weight due to cleavage of the main chain.

At this time, a crosslinked compound having a double bond between carbons in the structure is preferably used together. Any known crosslinked compounds can be also used. Examples of the crosslinked compound include ethylene, propene, isoprene, butadiene, styrene, α-methylstyrene, divinylbenzene, acrylic acids, methacrylic acids, monoallyl isocyanurate, diallyl isocyanurate, and triallyl isocyanurate. A crosslinked compound having two or more double bonds between carbons in its molecule can cause the crosslinking reaction to proceed efficiently. This compound is hence preferred.

Examples of the method in which a substance having a reactive group is immersed or mixed to forma crosslinked structure include: a method in which a low-molecular-weight compound having a reactive group is immersed into the resin mixture, followed by heating or irradiating with high-energy rays to cause a crosslinking reaction to proceed; and a method in which a low-molecular-weight compound having a reactive group is mixed beforehand, followed by heating or irradiating with high-energy rays to cause a crosslinking reaction to proceed.

A suitable method is to conduct a decomposition treatment simultaneously with the treatment for imparting infusibility, because the benefit of a cost reduction due to the reduction in the number of steps can be expected.

The resin mixture itself in which a microstructure resulting from the phase separation has been fixed in the step 2, or the precursor material which has been further subjected to the above-mentioned decomposition treatment and/or the treatment for imparting infusibility as required, the precursor material being in a state transformable into a porous carbon material by pyrolysis, is hereinafter referred to as a porous carbon material precursor.

[Step 3]

The step 3 is a step in which the porous carbon material precursor is pyrolyzed and carbonized to obtain a porous carbon material.

It is preferable that the pyrolysis is conducted by heating the porous carbon material precursor in an inert gas atmosphere to 800° C. or higher in order to sufficiently carbonize the precursor. The term "inert gas" herein means a gas which is chemically inert during the heating. Specific examples thereof include helium, neon, nitrogen, argon, krypton, xenon, and carbon dioxide. It is a preferred embodiment from the standpoint of economical efficiency that nitrogen or argon is used among these. Especially, in the case where the carbonization temperature is set to 1,500° C. or higher, it is preferred to use argon from the standpoint of inhibiting the formation of nitrides.

The carbonization temperature of 800° C. or higher is preferable because carbon crystal grains are efficiently formed. The lower the carbonization temperature is, the smaller the carbon crystal grain size becomes, while the higher the carbonization temperature is, the larger the carbon crystal grain size becomes. It is, therefore, preferable to suitably select the carbonization temperature in accordance with the target carbon crystal grain size.

The flow rate of the inert gas is not limited so long as the oxygen concentration within the heating device can be sufficiently lowered, and it is preferred to suitably select an optimal value in accordance with the size of the heating device, amount of the feed material to be supplied, heating temperature, etc. There is no particular upper limit on the flow rate of the inert gas. It is preferable that the flow rate of the inert gas is suitably set in accordance with a temperature distribution or the design of the heating device, from the standpoints of economical efficiency and of reducing temperature differences within the heating device. Furthermore, in the case where the gases which generate during the carbonization can be sufficiently discharged from the system, a porous carbon material having excellent quality can be obtained. This embodiment is hence more preferred. It is, therefore, preferred to determine the flow rate of the inert gas so that the concentration of the generated gases in the system is 3,000 ppm or less.

There is no upper limit on the temperature at which the precursor is heated. However, temperatures not higher than 3,000° C. are preferred from the standpoint of economical efficiency because the carbonization can be caused to proceed sufficiently at such temperatures and because the equipment requires no special processing.

With respect to heating methods in the case where the carbonization treatment is continuously performed, a method in which the material is continuously fed to and taken out from the heating device kept at a constant temperature, using rollers, conveyor, or the like is preferred because the productivity can be heightened.

Meanwhile, in the case where a batch treatment is conducted in a heating device, there is no particular lower limit on the heating rate and cooling rate. However, rates of 1° C./min or higher are preferred because the time period required for the heating and cooling can be shortened to thereby heighten the productivity. Further, there is no particular upper limit on the heating rate and cooling rate. It is preferred to employ as the upper limit on the heating rate and cooling rate a rate which is lower than the thermal shock resistance of the material that constitutes the heating device.

The time period for maintaining the precursor at the carbonization temperature can be set arbitrarily. The longer the time period for maintaining at the carbonization temperature, the larger the carbon crystal grains can grow, while the shorter the time period for maintaining at the carbonization temperature, the smaller the carbon crystal grains can be. It is, therefore, preferable to suitably set the time in accordance with the target applications. Five minutes or longer time period for maintaining at the carbonization temperature is preferable because carbon crystal grains can efficiently grow. Further, not longer than 1200 minutes of such time period is preferable because energy consumption can be suppressed and the porous carbon material of the present invention can be obtained efficiently.

The porous carbon material in the form of a powder can be produced when the porous carbon material precursor is subjected to pulverization treatment and the resulting material is then subjected to the above-mentioned step 3, or when the porous carbon material obtained through the step 3 is further subjected to pulverization treatment. A conventionally known method can be selected for the pulverization treatment and it is preferable to suitably select the method in accordance with the particle size to be attained through the pulverization treatment and the treatment amount. Examples of the method for the pulverization treatment include a ball mill, bead mill, and jet mill. Although the pulverization treatment may be continuous or batchwise, a continuous treatment is preferred from the standpoint of production efficiency. The filling material to be filled into the ball mill is suitably selected. It is preferable that a material based on a metal oxide, such as alumina, zirconia, or titania, or a material obtained by coating stainless steel, iron, or the like as cores with a nylon, polyolefin, fluorinated polyolefin, or the like is used for applications where inclusion of a metallic material is undesirable. For other applications, use of a metal such as stainless steel, nickel, or iron can be suitably used.

It is also a preferred embodiment from the standpoint of heightening the efficiency of pulverization that a pulverization aid is used during the pulverization. The pulverization aid is selected arbitrarily from among water, alcohols, glycols, ketones, etc. Ethanol and methanol are preferred alcohols from the standpoints of ease of availability and cost. In the case of using a glycol, ethylene glycol, diethylene glycol, propylene glycol, or the like is preferable. In the case of using a ketone, acetone, ethyl methyl ketone, diethyl ketone, or the like is preferable. It is preferable that the pulverization aid is removed by washing or drying after the pulverization.

The porous carbon material which has undergone the pulverization treatment is classified to give a material which is even in particle size. The porous carbon material which is even in particle size can form an even structure body when used, for example, as a filler, an additive to pastes, etc., and hence makes it possible to stabilize the efficiency of filling and the step of paste application. Consequently, it can be expected to heighten the production efficiency to attain a cost reduction. With respect to particle size, it is preferred to suitably select the size in accordance with applications of the pulverized porous carbon material.

EXAMPLES

Preferred examples of the present invention will be described below, but the following description should not limit the present invention at all.

Evaluation Methods

[Structural Period of Continuous Porous Structure]

A porous carbon material was sandwiched between specimen plates, and the position of a CuKα line source and the positions of the specimen and a two-dimensional detector were regulated so that information on scattering angles less than 10 degrees was obtained from the X-ray source obtained from the CuKα line source. From the image data (luminance information) obtained from the two-dimensional detector, the data on the central portion which had been affected by a beam stopper were excluded. Radius vectors from the beam center were set, and the values of luminance for the range of 360° at angular intervals of 1° were summed up to obtain a scattered-light-intensity distribution curve. From the scattering angle θ corresponding to the position of a peak in the curve obtained, the structural period of the continuous porous structure was obtained using the following equation.

In the case where the structural period was 1 μm or more and the peak of X-ray scattering was not observed, a continuously rotating image was taken with 0.3° step in a range of not less than 180° using an X-ray microscope to obtain a CT image. The obtained CT image was subjected to Fourier transformation to give a graph of scattering angle θ and scattered-light intensity, and the structural period of the continuous porous structure was then obtained using the following equation in the same method as above.

$$L = \frac{\lambda}{2\sin\theta}$$ [Mathematical Formula 2]

Structural period: L, λ: wavelength of incident X-rays

[X-Ray Diffraction Peak]

A porous carbon material was pulverized using a ball mill and the pulverized material was set on a specimen plate. Thereafter, a powder method was conducted using an X-ray diffractometer RINT2500, manufactured by Rigaku Cooperation to thereby obtain an X-ray diffraction profile.

[Presence/Absence of Carbon Crystal Grain and Carbon Crystal Grain Size, Existence Proportion of Carbon Crystal Grain]

Among porous carbon materials, an ultrathin fragment of a portion having a continuous porous structure was prepared for observation with a transmission electron microscope using a convergence ion beam, and this fragment was observed with the transmission electron microscope. In the case where black contrast portions were present in the branches of the continuous porous structure illustrated in FIGS. 2 and 3, it was judged that the portion having the continuous porous structure had carbon crystal grains. Further, ten portions of the obtained black contrast portions were taken randomly, and the area of the black contrast portion was determined based on the pixel size of the image of the photographed transmission electron microscope photograph. The area thereof was converted to a diameter of a circle equivalent to the area. The average value of the ten portions thus taken was calculated and the resulting value was determined as the carbon crystal grain size. A proportion in which the area of the obtained black contrast portion accounts for the whole area used for the analysis, was determined as an existence proportion of the carbon crystal grain.

In addition, as for the portion having no continuous porous structure, the presence/absence of the carbon crystal grain and the carbon crystal grain size, and the existence proportion of the carbon crystal grain were obtained in the same manner as above.

[Existence Proportion of Carbon Atom]

With respect to ten black contrast portions selected randomly among the ultrathin fragments in which the sizes of the above-mentioned carbon crystal grains were measured, the existence proportion of the carbon atom per weight was determined by energy dispersive X-ray spectrometry, and the average of the existence proportions thereof in the ten portions was determined as the existence proportion of the carbon atom.

[Average Porosity]

A porous carbon material was embedded in a resin, and a cross-section of the porous carbon material was thereafter exposed with a razor blade or the like. Using SM-09010, manufactured by JEOL Ltd., the specimen surface was irradiated with argon ion beams at an accelerating voltage of 5.5 kV to etch the surface. A central part of the resultant cross-section of the porous carbon material was examined with a scanning secondary-electron microscope at a magnification regulated so as to result in 1±0.1 (nm/pixel) and at a resolution of 700,000 pixels or higher, and a square examination region for calculation in which each side had 512 pixels was set in the resulting image. The average porosity was calculated using the following equation, in which A was the area of the examination region and B was the area of the pores or embedded portion.

Average porosity (%)=$B/A$×100

In the case where the electron-beam contrast between the porous carbon material and the embedded resin was weak and it was difficult to examine the specimen, electron staining was conducted by suitably using a heavy metal or the like based on the embedded resin used, before the examination.

[Acquisition of Pore Diameter Distribution Curve]

A porous carbon material was vacuum-dried under the conditions of 300° C. and 5 hours to thereby remove gas components which had been adsorbed. Thereafter, a pore diameter distribution curve was acquired using AutoPore IV9500, manufactured by SHIMADZU CORPORATION.

Example 1

Into a separable flask were introduced 70 g of polyacrylonitrile (Mw, 150,000) manufactured by Polysciences, Inc., 70 g of polyvinylpyrrolidone (Mw, 40,000) manufactured by Sigma Aldrich, and 400 g of dimethyl sulfoxide (DMSO) manufactured by Wakenyaku Co. Ltd., as a solvent. The contents were heated at 150° C. for 3 hours with stirring and refluxing, thereby preparing an even and transparent solution. In this solution, the concentration of the polyacrylonitrile and the concentration of the polyvinylpyrrolidone were 13% by weight each.

The DMSO solution obtained was cooled to 25° C. and then ejected at a rate of 3 mL/min from a one-orifice nozzle having an orifice diameter of 0.6 mm, and the extrudate was led into a pure-water coagulating bath kept at 25° C., subsequently taken off at a rate of 6 m/min, and accumulated in a vat to thereby obtain raw fibers. In this operation, the air gap was set at 5 mm, and the length of immersion in the coagulating bath was 15 cm. The raw fibers obtained were translucent and had undergone phase separation.

The raw fibers obtained were dried for 1 hour in a circulating dryer kept at 25° C., thereby removing the water present on the fiber surface. Thereafter, vacuum drying was conducted at 25° C. for 5 hours to obtain dried raw fibers as a precursor material.

The raw fibers as a precursor material were thereafter introduced into an electric furnace kept at 250° C. and heated in an oxygen atmosphere for 1 hour, thereby performing a treatment for imparting infusibility. The raw fibers which had undergone the treatment for imparting infusibility had changed to black in color.

The structure of the infusible raw fibers obtained was examined by electron-beam tomography. As a result, it was found that a structure derived from the polyacrylonitrile as a carbonizable resin had formed a continuous phase. The portion having the continuous porous structure had a structural period of 0.16 μm. A comparison between the structure of the infusible raw fibers and that of the porous carbon material which will be described later revealed that the structural period of that portion of the porous carbon material which had a continuous porous structure was mostly shorter than that of the porous carbon material precursor because the polyacrylonitrile resin had contracted during the carbonization treatment, and that despite such a change, the pattern configured of both the portion having the continuous porous structure and the portion having substantially no continuous porous structure remained unchanged.

The infusible raw fibers obtained were subjected to a carbonization treatment under the conditions of a nitrogen flow rate of 1 L/min, heating rate of 10° C./min, maximum temperature of 1,500° C., and holding time of 10 minute, thereby obtaining porous carbon fibers.

A core layer having a continuous porous structure was formed in a central part of the porous carbon fibers obtained, i.e., a porous carbon material, and the structural period thereof was 0.09 μm, and the average porosity thereof was 40%. This porous carbon material gave a pore diameter distribution curve which had pore diameter distribution peak at 50 nm, and analysis of the cross-section thereof revealed that the fiber diameter was 150 μm and the skin layer, which was formed around the core layer and was the portion having no continuous porous structure, had a thickness of 5 μm.

Furthermore, an even continuous porous structure was formed in the fiber center part.

When the X-ray diffraction profile of the porous carbon material was measured, a peak having a peak top of 25.5° was observed. Further, a peak having a peak top of 43.2° was also observed together. A fragment having a thickness of 80 nm was cut out from the portion which constituted a continuous porous structure using a convergence ion beam, and the structure thereof was examined using a transmission electron microscope. As a result, pores which constituted a continuous porous structure, shown by white contrasts, branches which constituted a continuous porous structure, shown by gray contrasts, and carbon crystal grains shown by black contrasts in a part of the gray contrast branches were observed as shown in FIG. 2. The carbon crystal grain size was 30 nm, and the existence proportion of the carbon crystal grain was 1.0%. In addition, the existence proportion of the carbon atom was 91% when measured. Further, the probe of the tester was applied to both ends of the obtained fibers and the electrical resistivity was then measured. The electrical resistivity thus measured was 1.0 Ω·m, showing excellent electrical conductivity. The results are shown in Table 1.

Example 2

Porous carbon fibers were obtained in the same manner as in Example 1, except that the carbonization temperature was 2000° C. and the atmosphere was changed from nitrogen to argon at a temperature of not less than 1500° C. The results are shown in Table 1.

Example 3

Porous carbon fibers were obtained in the same manner as in Example 1, except that the carbonization temperature was 2500° C. and the atmosphere was changed from nitrogen to argon at a temperature of not less than 1500° C. The results are shown in Table 1.

Comparative Example 1

To 50 g of a solution of phenol resole resin in 50% by weight methanol was added 15 g of polymethylmethacrylate (PMMA) manufactured by Wakenyaku Co. Ltd., and 100 g of acetone. The contents were stirred at room temperature for 24 hours to thereby obtain a polymer solution. The solution thus prepared was attempted to be formed into a fiber shape. However, such attempt was abandoned because the solution had no spinnability. Then, the solution thus prepared was poured into a pan made of PTFE, and the contents were dried at room temperature for three days. The dried contents were further dried in a vacuum oven at 23° C. for two days, and the temperature of the vacuum oven was subsequently set at 40° C., and the drying continued for two days to remove the solvent. The resulting sample was formed with a 30 mm×30 mm×2 mm flat plate under a pressing pressure of 10 kgf/cm$^2$ at a temperature of 180° C. for 10 minutes. This sample was stirred in acetone at room temperature for two days to thereby remove polymethylmethacrylate. Subsequently, while the inside of the electric furnace was kept in a nitrogen atmosphere, the temperature was increased to 1500° C. at a heating rate of 10° C./min to thereby obtain a sample. A fragment having a thickness of 80 nm was cut out from the surface of the obtained sample using a convergence ion beam to obtain an observation specimen. The observation with a transmission electron microscope was then attempted. No carbon crystal grain was present. In addition, an even structure like the continuous porous structure failed to be obtained. Furthermore, the electrical resistivity of the sample was measured to be 150 Ω·m, which was inferior to the electrical conductivity. The results are shown in Table 1.

TABLE 1

| | | Unit | Example 1 | Example 2 | Example 3 | Comparative Example 1 |
|---|---|---|---|---|---|---|
| Carbonizable resin | Kind | — | PAN | PAN | PAN | phenol resole |
| | Molecular Weight | ×10,000 | 15.0 | 15.0 | 15.0 | — |
| | Concentration | wt % | 13.0 | 13.0 | 13.0 | 21.7 |
| Eliminable resin | Kind | — | PVP | PVP | PVP | PMMA |
| | Molecular Weight | ×10,000 | 4.0 | 4.0 | 4.0 | — |
| | Concentration | wt % | 13.0 | 13.0 | 13.0 | 13.0 |
| Solvent | Kind | — | DMSO | DMSO | DMSO | methanol/acetone |
| | Concentration | wt % | 74.0 | 74.0 | 74.0 | 65.3 |
| State of solution | | — | transparent, even | transparent, even | transparent, even | transparent, even |
| Average porosity | | % | 40 | 39 | 37 | 25 |
| Pore diameter distribution | | nm | 50 | 45 | 45 | 60 |
| Thickness of skin layer | | μm | 5 | 5 | 5 | — |
| Fiber diameter | | μm | 150 | 146 | 143 | — |
| Structural period | | μm | 0.090 | 0.080 | 0.075 | — |
| Continuous porous structure | | presence/absence | presence | presence | presence | presence |
| X-ray diffraction peak (25° to 26°) | | ° | 25.5 | 25.6 | 25.8 | — |
| X-ray diffraction peak (42° to 45°) | | ° | 43.2 | 43.2 | 43.3 | — |
| Carbon crystal grain size | | nm | 30 | 35 | 50 | n.a. |
| Existence proportion of Carbon crystal grain | | % | 1.0 | 1.2 | 2.0 | 0.0 |
| Existence proportion of carbon atom | | wt % | 91 | 92 | 94 | — |
| Electrical resistivity | | Ω·m | 1.0 | 0.8 | 0.5 | 150 |

The invention claimed is:

1. A porous carbon material having a continuous porous structure having a structural period of 0.002 μm to 1 μm in at least a portion of the porous carbon material and comprising a carbon crystal grain.

2. The porous carbon material according to claim 1, comprising the carbon crystal grain in a branch which constitutes at least the continuous porous structure.

3. The porous carbon material according to claim 1, wherein an existence proportion of the carbon crystal grain is 0.1% or more.

4. The porous carbon material according to claim 1, wherein the carbon crystal grain has a size of 1 to 1000 nm.

5. The porous carbon material according to claim 1, wherein an X-ray diffraction profile by a powder method has at least one peak in a diffraction angle range of 25° to 26°.

6. The porous carbon material according to claim 1, wherein the X-ray diffraction profile by the powder method has at least one peak in the diffraction angle range of 42° to 45°.

7. The porous carbon material according to claim 1, further comprising a portion having substantially no continuous porous structure.

8. The porous carbon material according to claim 7, comprising a core layer which is a portion having the continuous porous structure, and a skin layer which is formed around the core layer and is a portion having substantially no continuous porous structure.

9. The porous carbon material according to claim 1, having a fiber form, a film form, or a particulate form.

* * * * *